July 24, 1962 W. E. DIETER ETAL 3,045,861
CLOSURE FOR EVACUATED AND/OR PRESSURIZED VESSEL
Filed Dec. 1, 1959 2 Sheets-Sheet 1

INVENTORS.
WESLEY E. DIETER
PAUL L. GOLDEN
STANLEY NAZARUK

BY Ernest S. Cohen

ATTORNEY

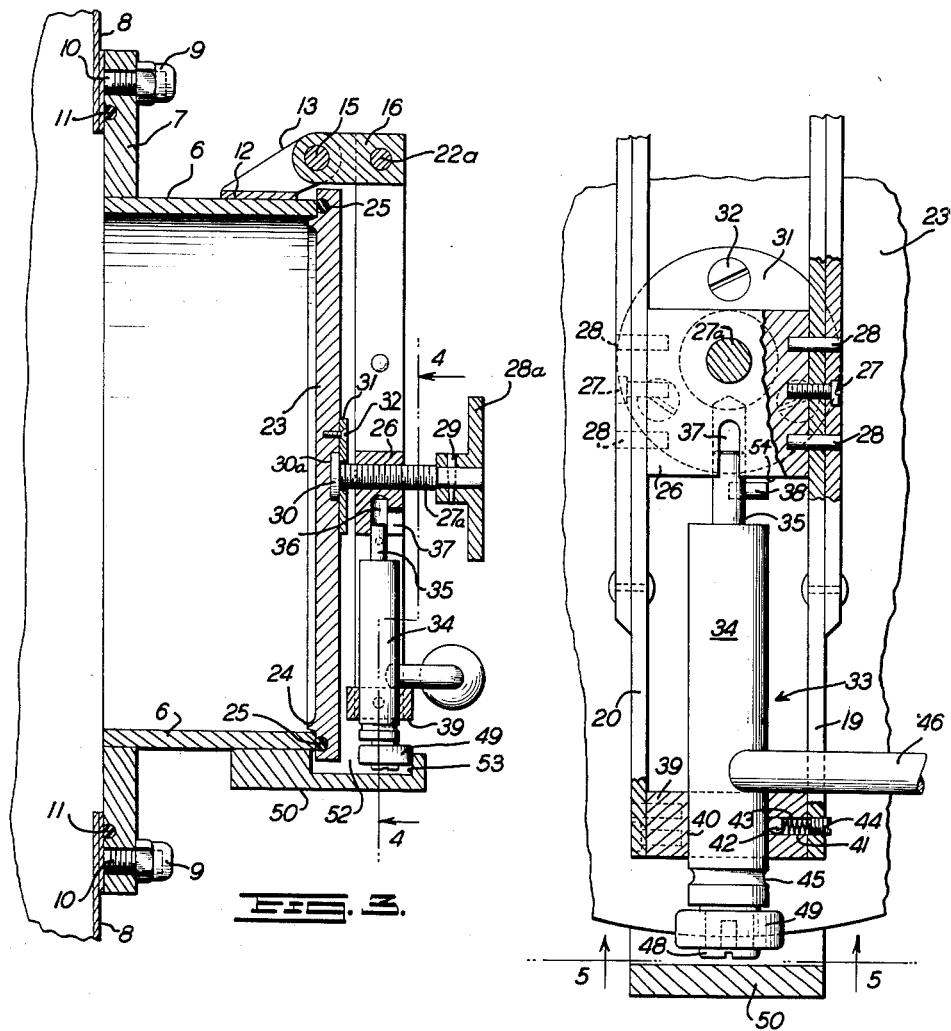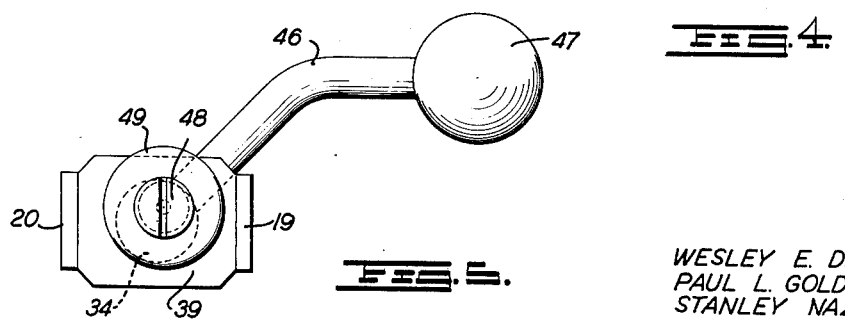
INVENTORS.
WESLEY E. DIETER
PAUL L. GOLDEN
STANLEY NAZARUK

3,045,861
CLOSURE FOR EVACUATED AND/OR PRESSURIZED VESSEL

Wesley E. Dieter and Paul L. Golden, Pittsburgh, and Stanley Nazaruk, Clairton, Pa., assignors to the United States of America as represented by the Secretary of the Interior
Filed Dec. 1, 1959, Ser. No. 856,624
3 Claims. (Cl. 220—57)
(Granted under Title 35, U.S. Code (1952), sec. 266)

The invention herein described and claimed may be manufactured and used by or for the Government of the United States of America for governmental purposes without the payment of royalties therein or therefor.

This invention relates to a door or closure, and locking means therefor, and more particularly to a closure and locking means for devices wherein a fluid-tight seal is required. Devices and applications wherein my invention is useful include pressure cookers, vacuum chambers, sterilizers, air locks in dry boxes, hatch covers, etc.

In dry-box equipment now available for handling harmful materials or for maintaining a controlled atmosphere within a confined space, the operator manipulates materials within the box by means of impervious gloves extending through a wall of the box. In one form of the apparatus, shoulder length neoprene gloves are attached to a front panel and the operator inserts his hands therein to perform the required operations within the protected region. If there is a door or hatch located within the box, as for example, a pressure chamber air lock, operating the hatch mechanism associated therewith can be quite awkward, and occasion considerable fumbling especially if the door is at an angle to the operator.

A latching mechanism which could be operated rapidly with one hand would obviate many of the difficulties encountered. In this invention, an arm is hingedly fastened to a collar surrounding an opening so as to be swingably movable thereover in a plane normal to the plane of the opening. A gasketed cover adapted to fit over the opening is fastened to the mid-section of the arm by an adjustable screw, whereby swinging the arm carries the cover with it.

At the end of the arm opposite the hinge and axially mounted thereon is a rotatable bolt which is slidable longitudinally. A cam roller is rotatably mounted on the end of the bolt, and is adapted to engage a latching shoulder so that when the bolt is extended and turned, the arm engages the latching shoulder and the arm is locked as a result of the cam action, the cover is pressed against the collar and leakage is prevented by the gaskets between them. To open the cover the bolt is turned to release the cam and moved upward out of engagement with the latching shoulder.

Although the device was described in connection with a cover located within a dry box, it is obvious that it may be widely used wherever a rapid opening and locking cover is desired.

It is an object of the present invention to provide a hinged cover for an opening which may be rapidly opened and rapidly and securely locked.

It is another object of this invention to provide a hinged cover which can be rapidly opened and shut wherein the locking mechanism involves a cam action and a sliding bolt action.

It is a further object of this invention to provide a cover structure comprising a cover adapted to be engaged with an annular gasketed seat and having an arm hinged to the seat and connected at its mid-portion to the cover by an adjustable screw, the arm being capable of being locked with the cover in seated position against the gasket by a sliding bolt and cam.

Further objects of this invention will become apparent from a consideration of the rest of the disclosures and claims, taken in connection with the accompanying drawings, wherein:

FIG. 3 is an elevational view in section taken at right angles to FIG. 1.

FIG. 4 is an enlarged view partly in sections along line 4—4 of FIG. 3, showing details of the sliding bolt assembly.

FIG. 5 is an end view showing the cam structure, taken along line 5—5 of FIG. 4.

Figure 1:
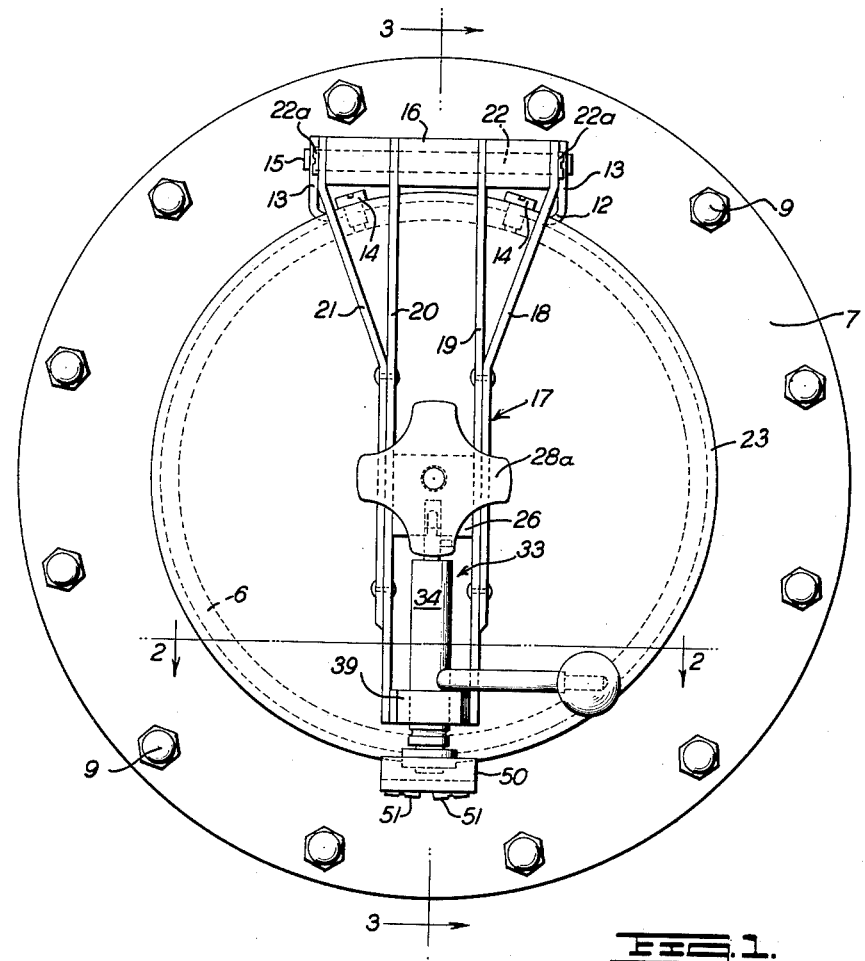
FIG. 1 is an elevational view of the hatch cover and latching means.

As shown in FIGS. 1 and 3, the cover structure comprises a collar 6 having a flange 7 which is bolted to wall section 8 by nuts 9 (only 2 are shown with reference numerals in FIG. 1) and stud bolts 10. O ring 11 forms a gasket between flange 7 and wall 8. A hinge support 12 curved to conform to collar 6 and having generally upright and forwardly angled ears 13, 13, is fastened to collar 6 by screws 14, 14. A hinge pin 15 is mounted on ears 13, 13 through circular openings and retained by cotter pins (not shown). A hinge 16, having the cross-sectional shape as shown in FIG. 3, is mounted on pin 15 and has rigidly fastened thereto an arm 17 consisting of four members, 18, 19, 20, and 21. As shown in FIG. 1, members 19 and 20 are joined to hinge 16 at the mid-portion, while outer members 18 and 21 are joined to the hinge at the ends thereof. These are bent inwardly and fastened to members 19 and 20, so as to brace and strengthen them. Arm members 18, 19, 20, and 21 are rigidly joined to the hinge in the following manner: Members 19 and 20 fit into slots cut into hinge 16 while members 18 and 21 fit over the ends thereof. Pin 22 passes through hole in the hinge and corresponding holes in arms 18, 19, 20, and 21. The ends of pin 22 receive screws 22a, which join arm 18 and 21 to the said pin.

Cover 23, adapted to fit over a seat member shown as a collar 6, has a ridge 24 spaced from the outer circumference, and an O ring 25 fitted into a groove in the said cover whereby by pressing the cover against the collar, as will be described hereinafter, a tight seal may be obtained.

Block 26 is mounted between arms 19 and 20 at their mid-portion by means of screws 27 and dowels 28 (see FIG. 4). Threadably mounted in block 26 is a loading screw 27a. Handle 28a is fastened to the end of the screw as by tapered pin 29, so that by rotating the handle, loading screw 27a turns slightly crowned bearing plate 30, which is fastened to the end of screw 27a and fits into a recess or socket 30a in cover 23. Retainer plate 31 which is mounted on cover 23 by screw 32 prevents removal of plate 30 from its recess. Block 26 serves in addition as a lateral brace between members 19 and 20 and tends to prevent side sway when the cover is under load.

Mounted in the lower portion of arm 17 is the sliding bolt assembly 33. This consists of a cylindrical pin or shaft 34 having concentrically mounted at its upper end pintle 35 which fits into hole or bore 36 in block 26. Slot 37 extends upwardly from the bottom or block 26 and connects hole 36 with the front face of the block. Stud 38 is mounted at right angles to pintle 35 and is adapted to move longitudinally in slot 37. A bearing block, 39, is fastened to the lower end of arm 17 and has a bore 40 passing therethrough in which pin 34 is rotatably and slidably mounted. Passing through arm 19 and block 39 until bore 40 is reached is cylindrical hole 41, which has mounted therein ball 42, pressure spring 43 and retaining and adjusting screw 44. Ball 42 is adapted to fit into circular groove 45 located near the bottom of pin 34, and functions as a retainer when the pin 34 is in retracted position, stud 38 then being near the upper end of slot 37.

An angled lever handle 46 having ball 47 mounted at its end, is joined to pin 34. It is apparent that pin 34 may be rotated and/or moved longitudinally by means of handle 46.

Figure 2:
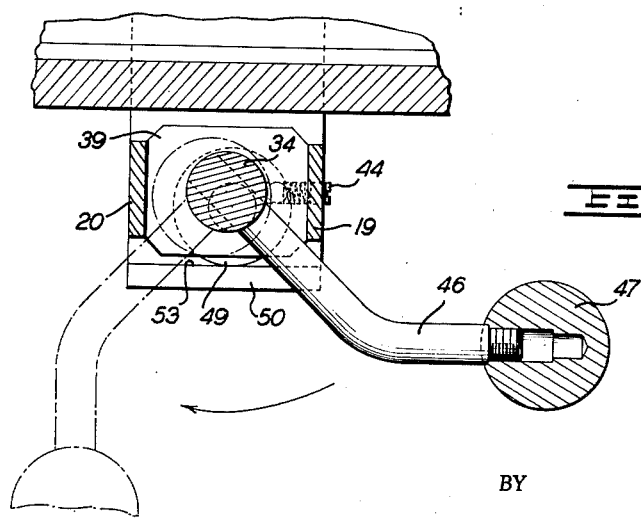
FIG. 2 is a sectional view taken along line 2—2 of FIG. 1.

Eccentrically fastened to the bottom of pin 34 by screw 48 is a cam roller 49, which conveniently may be a ball bearing. Cam detaining latch 50 is mounted on collar 6 by a pair of screws 51. As shown in FIG. 3, latch 50 has a recessed or channel shaped portion 52 which receives cam 49, and an inner face 53 against which cam 49 bears. As shown in FIG. 2, when lever 46 is to the right, cam 49 bears against face 53 and when it is moved to the left the cam is withdrawn from 53.

The closing pressure is set in the following manner: Cover 23 is first closed and latched. Loading screw 27a is then adjusted until cam roller 49 tends to snap in and out of engagement with face 53 on turning pin 34. This point represents the minimum latching load. The primary source of the spring loading resulting in the snap action is derived from the deflection of members 19 and 20 of arm 17. Lesser contributions are derived from O ring 25 and the deflection of cover 23.

Futrher load adjustment beyond this minimum is made if necessary as determined by the pressure within the vessel. Once this final load adjustment is made, no further adjustment is necessary except to compensate for normal wear and tear.

In the usual case, when the cover is unlatched stud 38 is located within slot 37, and ball 42 is seated in groove 45, retaining the pin in the retracted position. This eliminates the nuisance of fumbling for the locking position, i.e. inserting stud 38 into slot 37, which may be hidden from the operator. However, if the stud 38 is not in slot 37 when the cover is open, then ball 47 is grasped and pin 34 moved until these parts are in the proper alignment.

Latching the cover from the open position is simple and may be done rapidly with one hand without any visual observation. First cover 23 is swung shut, then pin 34 is pulled down, by manipulating handle 46, until stud 38 is out of slot 37, and handle 46 is then turned so that cam 49 engages face 53.

Various safety measures are incorporated in the device to prevent any accidental opening of the cover from the closed position. As shown in FIG. 2, the handle is swung a few degrees past dead center until lever 46 strikes the edge of arm 19, thereby substantially eliminating any chance of the cam accidentally rolling to the release position if the bolt handle is jarred slightly. In the closed position, stud 38 is located adjacent the bottom lower shoulder 54 of block 26 (see FIG. 4). Upward movement of pin 34 is limited by contact of stud 38 with the block 26, and release of the roller 49 from face 53 when under load is prevented thereby.

It is obvious that this invention may be adapted for openings of any geometrical shape, may be employed in a horizontal, vertical or angled position, is capable of numerous uses, and that various modifications may be made without departing from the spirit of the invention.

We claim:

1. A cover structure of the character described comprising a wall having an opening therein, a seat member defining a surface including a seating rim surrounding said opening, cover means comprising a closure element adapted to contact the seating rim to cover said seat member, and a bearing structure extending across said cover element, means hingedly connecting said cover means to the seat member, latching means for said cover means, said latching means comprising a shaft member operatively mounted on the said bearing structure of the cover means wherein said shaft member is journalled for rotational movement and guided for longitudinal sliding movement with respect to said bearing structure, said shaft member having respective inner and outer ends in relation to a medial portion of the cover means, said outer end of the shaft capable of extending beyond the cover means, an eccentric element rotatably mounted on said outer end of said shaft member, a keeper member having a recessed portion rigidly mounted on the said surface of the seat member adjacent its rim, a section of said recessed portion adapted to receive the eccentric element, and a rear wall on said recessed portion adapted to engage the eccentric element, whereby when the shaft is moved in said bearing structure of the cover means, to slide away from the said medial portion of the cover means, and to rotate, the eccentric is caused to engage and bear against said rear wall and the closure element of the cover means is forced against the seat member.

2. A cover structure of the character described comprising, a wall having an opening therein, a seat member defining a surface including a seating rim surrounding said opening, a cover member, a resilient gasket carried by said cover member for contacting the seating rim in a seating engagement with said seat member, an arm having one end pivotably connected to the vessel adjacent the opening, means adjustably connecting the arm and the cover member, a latching means for said cover member comprising a shaft member, said shaft member being axially disposed and journalled on said arm whereby the shaft member is arranged with respect to a medial portion of the cover member, to have an inner and outer end, and to be operable on said arm for limited rotational motion and sliding longitudinal motion, an eccentric rotatably mounted on the outer end of said shaft member, a keeper member having a recessed portion rigidly mounted on the said surface of the seat member adjacent its rim, said recessed portion being adapted to receive the eccentric, a rear wall on said recessed portion adapted to engage the eccentric, whereby when the shaft member is moved away from the medial portion of the cover member and rotated the eccentric is caused to engage and bear against said rear wall and the cover member and gasket are forced against the seat member.

3. A cover structure of the character described comprising, a wall having an opening therein, a seat member defining a surface including a seating rim surrounding said opening, a cover member, a resilient gasket carried by said cover member for contacting the seating rim in a seating engagement with said seat member, an arm having one end pivotably connected to the seat member, an adjustable coupling bolt threadably mounted on said arm, said bolt having bearing means at one end, socket means provided in said cover adapted to receive said bearing means for rotational movement therein, retaining means for preventing withdrawal of the bolt from the socket, a shaft member having an upper and a lower end, a first bearing means on the other end of said arm, the shaft member being disposed axially of said arm and journalled adjacent its lower end for rotational and longitudinal movement in said first bearing means, said shaft member having an upper and a lower axial position, relatively short stud means rigidly mounted on said shaft member near the upper end thereof and normal thereto, a second bearing means on said arm adapted to slidably receive the upper end of said shaft member and stud means, said second bearing means having a lower shoulder; whereby rotation of said shaft is prevented until it is moved downwardly a distance sufficient for the stud means to clear the said lower shoulder, handle means extending from the shaft means and integral therewith, an eccentric rotatably mounted on the lower end of said shaft member, a keeper member, including a channel section, rigidly mounted on the said surface of the seat member adjacent its rim, said channel section being adapted to receive the eccentric, a rear wall on said channel section adapted to engage the eccentric; whereby when the shaft member is moved down by said handle means and rotated, the stud means is disposed adjacent the lower shoulder of said second bearing means, the eccentric is caused to engage and bear against said rear wall and the cover and gasket are forced against the seat member; stop means on the arm, said handle means being adapted to shut the stop means on rotating the shaft means; whereby the eccentric is retained past dead center and said stud and shoulder means prevent accidental longitudinal disengagement of the eccentric from said rear wall.

References Cited in the file of this patent

UNITED STATES PATENTS

| | | |
|---|---|---|
| 1,956,665 | Cahall | May 1, 1931 |
| 2,078,003 | Klein | Apr. 20, 1937 |

FOREIGN PATENTS

| | | |
|---|---|---|
| 44,906 | Austria | Nov. 10, 1910 |